United States Patent [19]
Ziplies et al.

[11] Patent Number: 4,763,473
[45] Date of Patent: Aug. 16, 1988

[54] ARRANGEMENT FOR OPERATING A DIESEL HYDRAULIC DRIVE

[75] Inventors: Herbert Ziplies, Kamen; Heinrich Lackenberg, Selm, both of Fed. Rep. of Germany

[73] Assignee: O&K Orenstein & Koppel Aktiengesellschaft, Dortmund, Fed. Rep. of Germany

[21] Appl. No.: 35,546

[22] Filed: Apr. 7, 1987

[30] Foreign Application Priority Data

Apr. 7, 1986 [DE] Fed. Rep. of Germany ....... 3611553

[51] Int. Cl.[4] ............................................... F16D 31/02

[52] U.S. Cl. ........................................ 60/431; 60/329; 60/445; 60/449; 60/486; 417/34; 417/216; 417/218

[58] Field of Search ................. 60/428, 449, 445, 329, 60/486, 431; 417/216, 218, 34

[56] References Cited

U.S. PATENT DOCUMENTS

| | | | |
|---|---|---|---|
| 4,256,439 | 3/1981 | Kosodo et al. | 417/216 |
| 4,507,057 | 3/1985 | Igarashi et al. | 417/216 |
| 4,596,517 | 6/1986 | Laguionie | 417/216 |
| 4,600,364 | 7/1986 | Nakatani et al. | 417/218 X |

OTHER PUBLICATIONS

"Hydraulics", Hitachi Co. publication, Jan. 5, 1987.

*Primary Examiner*—Edward K. Look
*Attorney, Agent, or Firm*—Martin A. Farber

[57] ABSTRACT

An arrangement for operating a diesel-hydraulic drive on a construction machine in limit-load control with a microprocessor controller in which the installed hydraulic power is greater than the rated output of the diesel engine. Upon thermal and/or diesel-engine overload the hydraulic power which can be taken off is reducible; in the case of non-output loading, after a selectably predetermined time the diesel engine can be switched to idling speed of rotation and hydraulic displacement pumps can be operated with minimum delivery oil quantity; and the adjustable hydraulic displacement pumps can be adjusted in accordance with selectably predeterminable output curves.

13 Claims, 1 Drawing Sheet

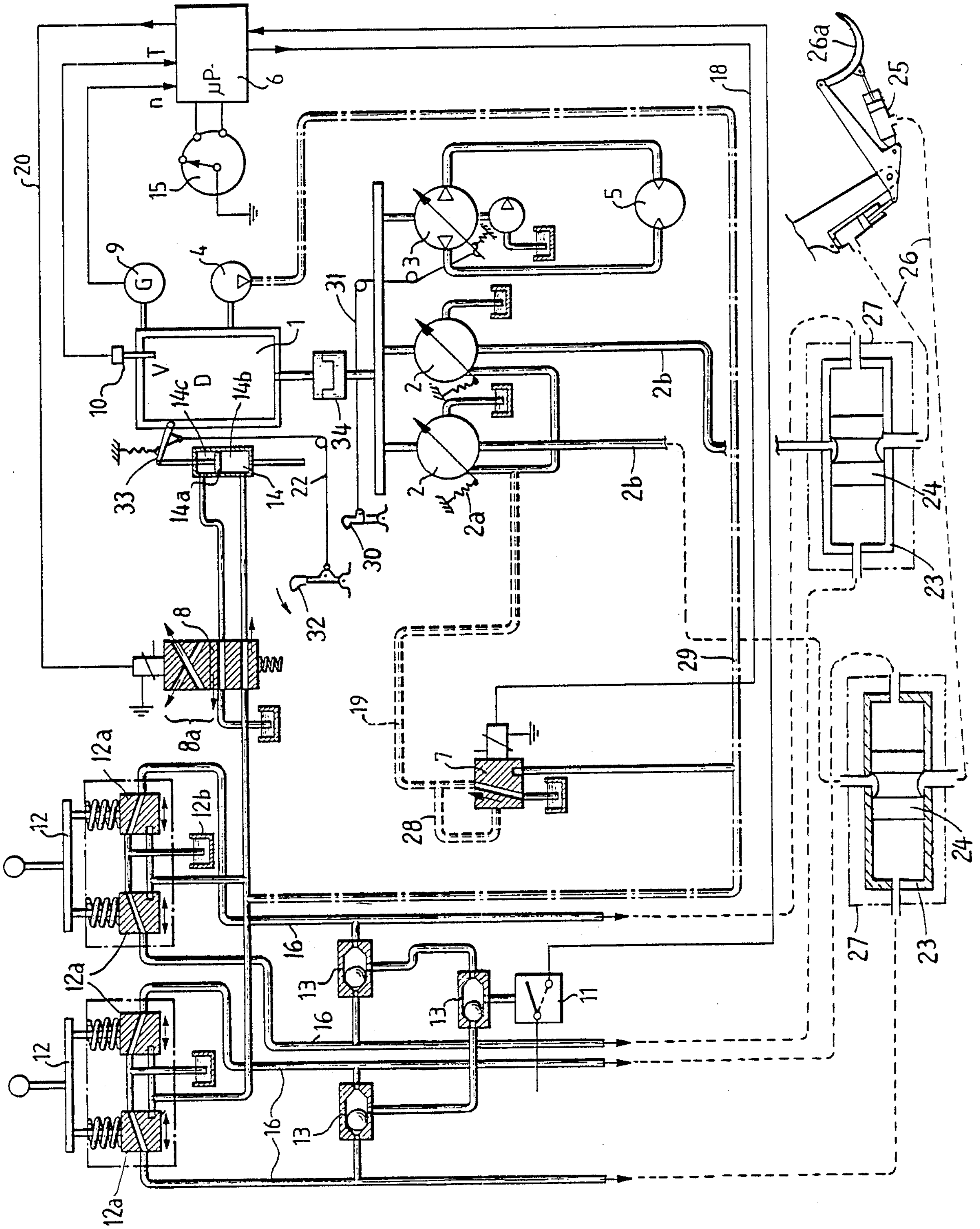
μP-
T
n
6
18
20
15
9
G
4
5
3
31
1
V
D
14c
14b
10
33
14a
14
22
34
30
32
2
2a
2b
8
8a
19
29
7
28
12
12a
12b
13
16
11
23
24
25
26
26a
27

ARRANGEMENT FOR OPERATING A DIESEL HYDRAULIC DRIVE

FIELD AND BACKGROUND OF THE INVENTION

The invention relates to an arrangement for operating a hydraulic drive, in general, and to an arrangement for operating a diesel-hydraulic drive on a construction machine in limit-load control with a microprocessor controller in which the installed hydraulic power is greater than the rated output of the diesel engine, in particular.

It is an object of the invention to effect a displacement of hydraulic pumps as part of a control such that the diesel engine is operated at all times with minimum supply of energy and is protected against overload.

SUMMARY OF THE INVENTION

According to the invention, upon thermal and/or diesel-engine overload the hydraulic power which can be taken off is reducible; in the case of non-output loading, after a selectably predetermined time the diesel engine (1) can be switched to idling speed of rotation and hydraulic displacement pumps (2) can be operated with minimum delivery oil quantity; and the adjustable hydraulic displacement pumps (2) can be adjusted in accordance with selectably predeterminable output curves.

An advantage of the invention resides in the fact that the driving diesel engine of the construction machine can be operated with maximum efficiency.

In addition to this, it is possible in this way to select the rated output of the diesel engine less than the total installed hydraulic output of the drives on the construction machine, whereby a saving in costs also becomes possible.

According to a further aspect of the invention, the diesel engine (1) is coupled mechanically to a speed-of-rotation generator (9), the output voltage of which is fed as an input variable to the microprocessor controller (6).

Still further according to the invention, the diesel engine (1) is equipped with a temperature sensor (10), the measurement values of which are fed as an input variable to the microprocessor controller.

Yet further, by the invention control lines (16) of the pilot-control hand levers (12) are connected via change valves (13) with a pressure switch (11), the position report signal of which is fed as an input value to the microprocessor controller (6).

Also the invention provides a selector switch (15) which via the connecting lines (17) of which, a selectively vertically displaceable displacement-pump output function stored in the microprocessor controller (6) can be used for setting the proportional valve (7) via a microprocessor controller output line (18).

Furthermore, the proportional valve (7) is connected by setting lines (19) to the displacement pumps (2).

According to the invention, there can also be provided a solenoid valve (8) which, as a function of a signal of the microprocessor controller (6) on output lines (20), acts on the speed-of-rotation setting cylinder (14) on the diesel engine (1) via the lines (21).

Still further, the speed-of-rotation setting cylinder (14) is adjustable via a connection (22) as a function of deflection of the gas lever for the diesel engine (1).

Additionally, for the control of the displacement pumps (2) on the basis of a displacement-pump output function which is stored as a desired value in the microprocessor controller (6), a determinable magnitude deviation of an actual value can be pre-established.

BRIEF DESCRIPTION OF THE DRAWING

With the above and other objects and advantages in view, the present invention will become more clearly understood in connection with the detailed description of a preferred embodiment, when considered with the accompanying drawing, wherein the only FIGURE of the drawing shows a circuit digram of a control system of the hydraulic drive.

DETAILED DESCRIPTION OF THE PREFERRED EMBODIMENT

Modern development in the field of microprocessors today makes available known control components which are also suitable for use with construction machines and which can optimally control or regulate functional sequences. Thus, the present invention uses a known per se microprocessor controller 6. The speed-of-rotation (rpm) of a diesel engine 1 of a construction machine for example is detected by means of a speed-of-rotation (rpm) generator 9 which is mechanically connected to the engine and fed to the microprocessor controller 6 as an input variable. The temperature of the diesel engine 1, determined via a temperature sensor 10, is furthermore fed as an input variable to the microprocessor controller 6. Furthermore, control lines 16 of pilot-control hand levers 12 of the construction machine are connected via change valves 13 to a pressure switch 11, the report of the position of the latter being fed as an input value to the microprocessor controller 6.

Depending on the speed of rotation of the diesel engine 1, displacement pumps 2 mechanically driven by the engine via clutch 34 and gears are operated with a given pump output which corresponds to the engine speed of rotation.

The displacement pumps 2 are mechanically displaced as a result of the control oil pressure in the line 19 of an auxiliary control circuit. Each pump has its own pump output curve of the quantity of oil produced (oil delivery output) vs. control oil pressure. This represents an inherent characteristic of the machine such as for example a construction machine.

If the temperature sensor 10 now responds, i.e. if the temperature of the diesel engine 1 becomes too high, then the automatic control mechanism of the invention goes into action via the microprocessor controller 6 and, via line 18 and valve 7 or respectively line 19, sets back or reduces the hydraulic power given off by the displacement pumps 2. This control process takes into account the particular event of overheating of the diesel engine 1. The entry into normal operation of the displacement pumps 2 by the automatic system is referred to as a superposition function.

The arrows on the displacement pumps 2 express an angle of displacement with respect to the control hydraulic pressure of the valve 7 through the line 19. The displacement pumps 2, which normally operate without displacement with full output, are set back by means of an auxiliary hydraulic control circuit 29. A feedback line 28, indicated in dot-dash line, on the valve 7 provides a feed-back signal as to the oil pressure in the line 19 of the auxiliary control circuit 29 controlled via the valve 7 to the position of the valve 7. This provides a return message which stabilizes the position of the valve 7.

An auxiliary supply pump 4, coupled to be driven by the engine 1, feeds the hydraulic control circuit 29 for the setting of the load valves and auxiliary position transmitters. The load control is then carried out by them separately with the delivered hydraulic output in lines 26 from output lines 2*b* from the displacement pumps 2.

The auxiliary supply pump 4, as can be noted from the drawing, inter alia, via the hand levers 12 or respectively the positions of their valves 12*a*, via the control lines 16, feeds a control block 27 of each load valve 12*a*. The setting member, for example a setting piston 24, is set there by the flow of control oil through the lines 16. The setting piston 24 then, in its turn, by its position, releases to the load hydraulic circuit lines 26 the delivery oil from the output lines 2*b* of the displacement pumps 2 for respective work equipment, e.g. shovel 26*a*. The lines 16 therefore go to respective control blocks 27 of each consumer load, for instance hydraulic cylinder 25 for the respective work equipment.

In a memory of the microprocessor 6 there are programmed, pre-established as desired values for the operation of the displacement pumps 2, an output function of the displacement pumps as well as values to shift this output function vertically in accordance with the position of a selector switch 15 which thus changes the desired values within selectable regions. Thus the switch 15 in one position of the unnumbered contacts of the selector switch 15 can predetermine operation in the limit-output range as a desired value and in another position, via one connecting line 17, can shift the desired value to another, and particularly a lower, output range of the displacement pumps.

By the selector switch 15 different output curves programmed in the memory are selected of delivery quantity of oil vs. control pressure of oil. For instance, in the illustrated position of the pointer of the selector switch 15, the highest obtainable value is established as the desired value for the microprocessor controller 6. In the next clockwise position, the connecting point of the line 17, a pump output characteristic curve is selected at half level, and in the third position, at one-quarter level as the desired value. Corresponding to the output of the microprocessor controller 6 thus produced, the proportional valve 7 is controlled via the microprocessor controller output line 18 and sets the displacement pumps 2 in the manner of the afore-mentioned superposition function.

The proportional valve 7 which is an electric solenoid valve controlled by the PID controller, also operates in the auxiliary control circuit 29 of the hydraulic circuit of the auxiliary supply pump 4. Depending on the extent of the opening of the valve 7 and via the line 19, the pump output of the displacement pumps 2 is varied. The displacement of the displacement pumps 2 is effected by the control oil pressure in the line 19 against the pressure of a spring 2*a* on the displacement pumps 2. The higher the control pressure, the more the pump output of the displacement pumps 2 is displaced.

There is also provided a solenoid valve 8 which is controlled by a signal from the microprocessor controller 6 in the line 20. By the solenoid valve 8 the hydraulic oil from the auxiliary supply pump 4 in the output line or circuit 29 acts on a speed-of-rotation (rpm) setting cylinder 14 on the diesel engine 1 via lines 21. This occurs in such a manner that the speed of rotation of the diesel engine 1 is brought back to the idling speed of rotation when the diesel engine 1 is subjected to a non-output loading for a selectably predeterminable time. The hydraulic displacement pumps 2 are then operated with minimum delivery oil quantity.

The valves 12*a* of the hand-control levers 12 are known per se proportional valves. The more they are deflected by movement of the projecting levers, the greater is the hydraulic pressure fed to the control block 27 through the respective lines 16. The valves 12*a* of the hand levers 12 feed the control block 27 of each consuming load in accordance with the deflection of the hand lever 12 via one or the other lines 16. These valves 12*a* are therefore arranged in pairs or two parts since upon flow, for instance, of a control hydraulic fluid in line 29 and operation of the hand-control levers 12, liquid flows over the right-hand one of the lines 16 to the setting member 23 and the oil displaced in the control block 27 from the setting member 23 on the opposite side flows back over the left-hand line 16 and the other valve 12*a*, in each case, into the oil sump 12*b*.

The hand levers 12 are moved by the operator of the construction machine. The degree of their selection is converted, via the proportional valves 12*a* into setting commands for the connected consuming loads, for instance a hydraulic cylinder 25 for the shovel 26*a* or a hydraulic cylinder for the stick or boom of the excavator, etc.

If no hydraulic output is required of the displacement pumps 2, i.e. no consuming load is connected to the hydraulic working circuit 26, then the diesel engine 1 operates approximately in the idling condition. In that case the solenoid valve 8 is in the position shown. From the auxiliary control hydraulic circuit 29 of the pump 4 which is driven by the engine 1, pressurized hydraulic oil flows via the solenoid valve 8 into the lower piston chamber 14*b* of the speed-of-rotation setting cylinder 14. Then the speed-of-rotation lever 33 (which may comprise the lever of a governor or be connected thereto) is located at the upper position shown, which represents its idling position for the engine 1. This speed-of-rotation lever 33 is located above the speed of rotation setting cylinder 14.

In normal operation, i.e., in working cycles, the speed-of-rotation lever 33 is set corresponding to the deflection position of a gas-pedal or gas-lever 32 for the diesel engine 1. For this a mechanical connection is provided from the gas pedal or lever 32 out of the driver's cab of the construction machine to the speed-of-rotation lever 33 corresponding to connection train 22. The speed of rotation connection train 22 can comprise a mechanical Bowden cable which extends from the gas lever 32 in the driver's cab of the construction machine to the lever 32 or to the piston 14*a* and is operated by the driver.

If a load is now provided on the working equipment 26*a*, i.e. the displacement pumps 2 produce a working hydraulic flow, then the speed-of-rotation connection lever 33 of the diesel engine 1 must be moved by means of the speed-of-rotation connection train 22 to a lower position. The lever 33 is lowered downwardly via the speed-of-rotation connection train 22 by operation of the gas-lever 32 by the driver of the construction machine and effects a higher speed of rotation of the diesel engine 1. To this there is superimposed the influence of the oil pressure of the control circuit 29 via the lines 21 as a function of the position of the solenoid valve 8. At the same time as the demand of a load, a command is given to the solenoid valve 8 via the microprocessor controller 6 to shift the solenoid valve 8 downwardly, so that the auxiliary control hydraulic oil in line 29 is conducted into the upper piston chamber 14c of the rpm cylinder 14 corresponding to the upper valve portion 8a of solenoid valve 8. The lever 33 is lowered. The diesel engine 1 then operates, corresponding to the lowered position of the speed-of-rotation lever 33 with a higher speed of rotation.

If no working pump output is demanded via the displacement pumps 2 for a certain period of time, then the microprocessor controller 6 detects this via the open condition of switch 11 and a timer means (not shown) and sends a signal via the line 20, so as to shift the solenoid valve 8 back into the position shown in the drawing, and thus reduces the speed of rotation of the diesel engine 1. In the event of a new demand for power on the equipment, a resetting of the solenoid valve 8 into the upper valve portion 8a line paths again takes place immediately.

A setting pump 3 is not included in the limit-load control. As indicated by the arrow shown at the pump 3 in the drawing, this displacement pump 3 is of course also controlled. Its control takes place, by means of a hand lever 30 via a Bowden cable 31 from the driver's cab. The pump 3 feeds a separate consuming load, for instance a swing mechanism (turntable) 5 as diagrammatically indicated, with which, for instance, the turning movement of the construction machine, such as for instance an excavator, can be controlled with a special drive.

The manner of operation of the control is in further detail as follows:

The microprocessor controller 6 receives measurements of the speed of rotation of the diesel engine 1 via the speed-of-rotation generator 9.

With the pressure switch 11 open as illustrated, this speed of rotation, which may be any desired speed of rotation and corresponds approximately to the idling speed of rotation of the diesel engine 1, is interpreted as the desired value by the microprocessor controller 6, since no action on the hydraulic circuit by pilot-control variables of the pilot control levers 12 is preset.

If a working movement is introduced via the pilot control hand levers 12 then a pressure signal in a line 16 effects a closing of the pressure switch 11 via the change valves 13.

The controller 6 now interprets as an actual value the speed of rotation which is now measured by the rpm generator and carries out a comparison between the desired and actual values. The desired value resulted from the measured value of the speed of rotation just before the closing of the pressure switch 11 and the engine characteristic diagram stored in the controller 6.

If the power consumed by the displacement pumps 2 and the output of the setting pump 3 which is also provided and which can operate on a special work circuit, for instance that of the rotary mechanism 5, are greater than the power output from the diesel engine 1, a control deviation results due to the reduction of the speed of rotation of the diesel engine 1.

The microprocessor controller 6 detects this and then produces an electric PID signal which, via the microprocessor control output line 18 and the proportional valve 7, so effects a reduction in power of the displacement pumps 2 that the pump delivery flow in delivery lines 2b is reduced. This continues until no control deviation is present any longer which is detected by the controller 6 via the rpm generator 9. For carrying out the control of the displacement pumps 2, a deviation from the actual value corresponding to ordinary control process, is possible within given limits.

By the temperature sensor 10, the diesel engine 1 is prevented from thermal overload in the manner that when a predetermined limit temperature set in the microprocessor controller 6 is detected by the temperature sensor 10, the displacement pumps 2 are reduced in their power consumption via and by a signal sent from the controller 6 to the proportional valve 7, until the temperature again drops below the limit temperature. In the event of overheating of the diesel engine 1, which is measured by the temperature sensor 10, the microprocessor controller 6 sends, within the limit load control, a signal to the solenoid valve respectively the proportional valve 7 such that a larger auxiliary control hydraulic pressure resets the displacement pumps 2 via the line 19. In this way the diesel engine 1 is under less load driving the pumps 2 and the danger of overheating is reduced.

If after a pre-selectable period of time the microprocessor controller 6 determines that no hydraulic power is demanded via the pilot-control hand levers 12 then it sends to the solenoid valve 8 a signal which moves the solenoid valve 8 so that the control oil in line 29, via the speed of rotation setting cylinder 14 and lever 33, effects a reduction of the diesel engine rpm to idling. Furthermore, the microprocessor controller 6 sends a signal through line 18 which shifts the displacement pumps 2 to minimum delivery via the proportional valve 7.

If a working movement is now introduced via the pilot control hand levers 12, this is made known to the microprocessor controller 6 via the pressure switch 11. Via a signal sent to the solenoid valve 8 by the controller 6 the diesel engine 1 is made to run with its previously set speed of rotation. When this is reached, the microprocessor controller 6 sees to it by sending a signal to and via the proportional valve 7, that the displacement pumps 2 are slowly set to the hydraulic power required.

By means of a selected position of the contacts of the selector switch 15 it is possible to limit the power consumed by the displacement pumps 2 in a selectable manner according to a kind of superposition function.

In accordance with the present invention, not only the power engine 1 but also the entire hydraulic control system can be operated economically without being overheated, since the load applied to the engine is forced to decrease if overheated.

While the presently preferred embodiment of the present invention has been shown and described, it is to be understood that this disclosure is for the purpose of illustration only and not in a limiting sense and that various changes and modifications may be made without departing from the scope of the invention as set forth in the appended claims.

We claim:

1. In an arrangement for operating a diesel-hydraulic drive on a construction machine in limit-load control with a microprocessor controller wherein installed hydraulic power is greater than the rated output of a diesel engine of the construction machine, the improvement comprising:

hydraulic displacement pump drivingly connected to the engine for providing the hydraulic power;

first means for reducing the hydraulic power upon thermal and/or diesel-engine overload;

second means for switching the diesel engine to idling speed of rotation and for operating the hydraulic displacement pumps with minimum delivery quantity of hydraulic liquid upon non-output loading of said displacement pumps for at least a selectably predetermined time; and third means for adjusting said hydraulic displacement pumps in accordance with selectably predeterminable output functions.

2. The arrangement according to claim 1 further comprising an rpm generator mechanically coupled to said diesel engine, said rpm generator is connected to the microprocessor controller such that an output voltage of of said rpm generator is fed as a input variable to said microprocessor controller.

3. The arrangement according to claim 1 further comprising a temperature sensor for detecting the temperature of said engine and connected to the microprocessor controller so as to feed temperature measurement values as an input variable to said microprocessor controller.

4. The arrangement according to claim 1 further comprising pilot-control hand levers, a pressure switch connected to said microprocessor controller, change valves, and hydraulic control lines of the pilot-control hand levers are connected via said change valves with said pressure switch, a position report of the latter being fed as an input value to the microprocessor controller.

5. The arrangement according to claim 1 wherein said first means comprises a proportional valve operatively connected to said displacement pumps and to said microprocessor controller, said microprocessor controller has a selectively vertically displaceable displacement-pump output function stored therein, said third means comprises a selector switch, connecting lines connecting said selector switch with said microprocessor controller, and said selector switch via said connecting lines selectively sets the proportional valve via the microprocessor controller by the selectively vertically displaceable displacement-pump output function stored in the microprocessor controller.

6. The arrangement according to claim 5 wherein said first means further comprising setting lines hydraulically connecting the proportional valve to the displacement pumps for control of the latter by the former.

7. The arrangement according to claim 1 wherein said second means comprises an rpm setting cylinder for setting said engine, a solenoid valve connected to said microprocessor controller via an output line and connected to the rpm setting cylinder via hydraulic control lines, and said solenoid valve, as a function of a signal of the microprocessor controller in said output line, hydraulically controls said rpm setting cylinder on the diesel engine via said hydraulic control lines.

8. The arrangement according to claim 7 wherein said second means further comprises connection means for operatively adjusting said rpm setting cylinder as a function of deflection of a gas lever of the diesel engine for further setting said engine.

9. The arrangement according to claim 1 wherein said first means is for controlling the displacement pumps by a displacement-pump output function stored as a desired value in the microprocessor controller with a predetermined deviation of an actual value.

10. A control system for operating at least one hydraulic unit of a machine by an engine, the engine having a power control unit, comprising at least one hydraulic pump drivingly connected to the engine, a hydraulic circuit supplying oil from the pump to the hydraulic unit, a control block in the hydraulic circuit for controlling the amount of oil to the hydraulic unit, control means for operating the control block, a two-way valve for controlling the power control unit, a proportional valve for regulating the hydraulic pump, an auxiliary pump connected to the engine for supplying oil to the two-way valve, the control means and the proportional valve, sensing means for detecting engine operation conditions, switch means for detecting a control pressure of the control means, and a controller for producing signals to operate the proportional valve and the two-way valves in response to signals from the sensing means and switch means so that engine operation goes to a normal operating condition when overheated or overloaded.

11. The control system according to claim 10, wherein said sensing means comprises a temperature sensor and an rpm sensor of the engine.

12. The control system according to claim 10, wherein said control means comprises a manual handle and a proportional valve which is switchable in two directions.

13. The control system according to claim 12, wherein said control block comprises at least one setting member for controlling the amount of oil to the hydraulic unit by operating said handle.

* * * * *